INVENTOR.
GERARD P. DEYERLING
BY
William N. Antonis
ATTORNEY

May 14, 1968  G. P. DEYERLING  3,382,955
TELESCOPIC FRICTIONAL SHOCK ABSORBER
Filed Sept. 26, 1966  2 Sheets-Sheet 2

INVENTOR.
GERARD P. DEYERLING
BY
William N. Antonis
ATTORNEY

United States Patent Office 3,382,955
Patented May 14, 1968

3,382,955
TELESCOPIC FRICTIONAL SHOCK ABSORBER
Gerard P. Deyerling, South Bend, Ind., assignor to The Bendix Corporation, a corporation of Delaware
Filed Sept. 26, 1966, Ser. No. 581,955
2 Claims. (Cl. 188—129)

ABSTRACT OF THE DISCLOSURE

A telescopic dry friction-type shock absorber which includes an outer tubular member having an inner cylindrical braking surface located therein, an inner tubular member located within and axially movable relative to said outer tubular member, split rings for frictionally engaging the inner cylindrical braking surface, and force-transmitting means for urging the rings radially outwardly against the cylindrical braking surface upon relative movement between the inner and outer tubular members. A shock absorber can also include restraining means for preventing further relative movement between the inner and outer tubular members after a predetermined amount of relative movement therebetween.

---

One of the objects of this invention is to provide a unique telescopic dry friction type device for absorbing energy which is more simple and effective than comparable known devices.

More specifically, it is an object of this invention to provide a telescopic frictional shock absorber comprising an outer tubular member having an inner cylindrical braking surface located therein, an inner tubular member located within the outer tubular member and axially movable relative thereto, split rings operatively connected to the inner tubular member for frictionally engaging the inner cylindrical braking surface, and force transmitting means operatively connected to the split rings for urging the rings radially outwardly against the cylindrical braking surface upon relative movement of the inner and outer tubular members toward each other.

Another object of this invention is to provide a telescopic frictional shock absorber of the type described wherein the force transmitting means is comprised of an axially disposed tapered pin fixedly connected to the outer tubular member and extending within the inner tubular member, and a plurality of balls located between and in contact with the split rings and the tapered pin, said shock absorber including restraining means for preventing relative movement of the inner and outer tubular members away from each other after a predetermined amount of relative movement of said members towards each other.

A further object of this invention is to provide a telescopic frictional shock absorber of the type described wherein the split rings have radially inwardly directed wedge faces, and the force transmitting means is comprised of a pair of compression rings having radially outwardly directed wedge faces for engaging the wedge faces of the split rings, one of said rings being formed on the end of the inner tubular member and the other of said rings being formed on a piston located within the outer tubular member, and a fluid filled bellows connected to the piston for urging the piston towards the inner tubular member and forcing the split rings radially outwardly against the braking surface upon relative movement of the inner and outer members toward each other.

Figure 1:
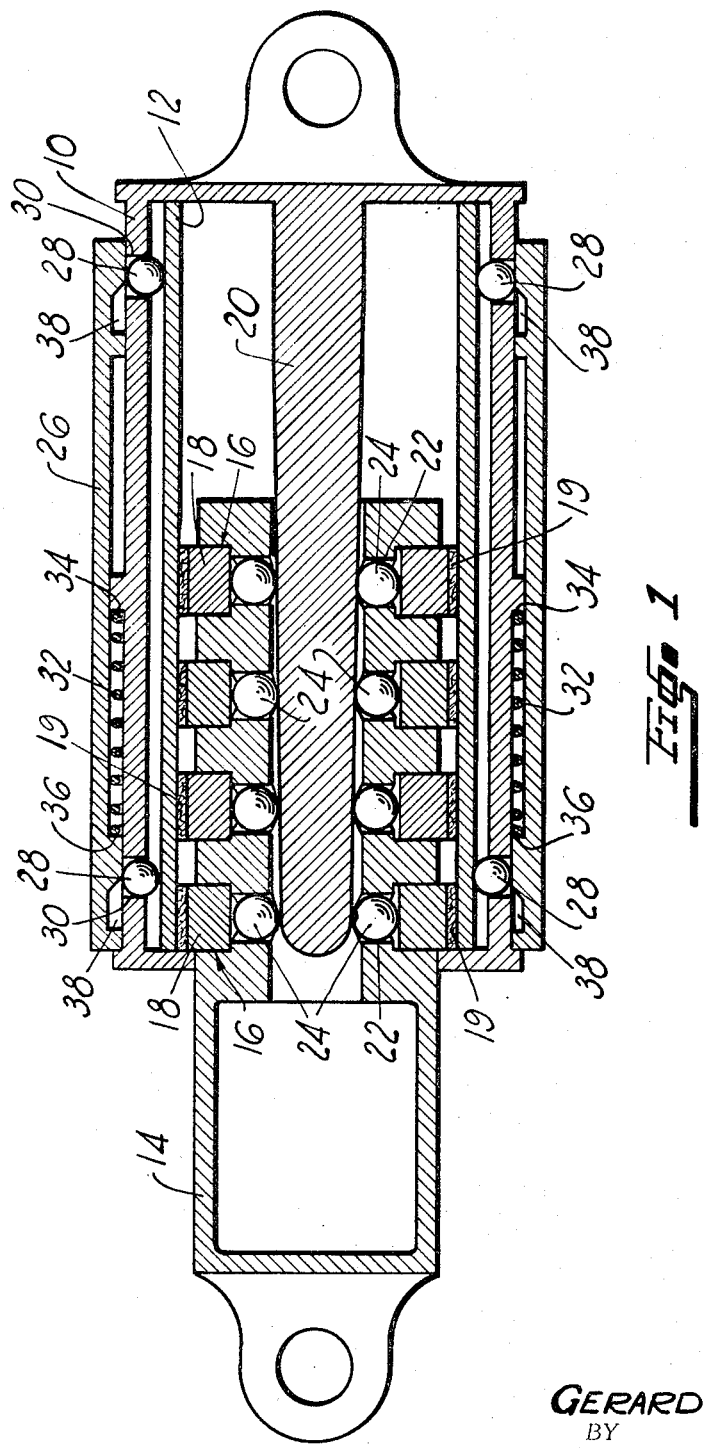
Figure 2:
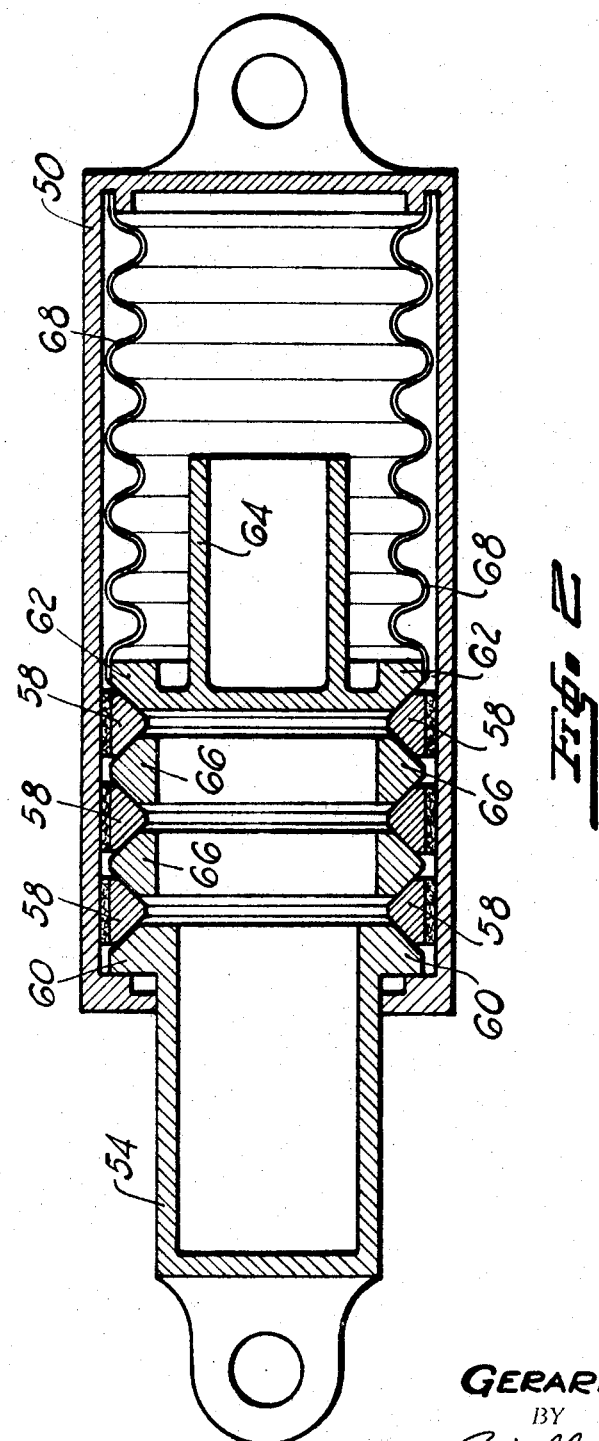

The above and other objects, features and advantages of this invention will become apparent from the following description taken in connection with the accompanying drawing which forms a part of this disclosure and in which:

FIGURE 1 is a sectional view of a shock absorber incorporating the invention; and FIGURE 2 is a sectional view of another embodiment of a shock absorber incorporating the invention.

Referring to FIGURE 1 of the drawing, it will be seen that numeral 10 designates an outer tubular housing member in which is located a split sleeve 12 the inner surface of which constitutes a cylindrical braking surface. An inner tubular member 14 is telescoped within the housing member and split sleeve and is axially movable relative thereto. The inner tubular member is suitably connected to a sprung mass whereas the housing member is suitably connected to an unsprung mass. Located in each of a plurality of annular grooves 16 formed on the inner tubular member is a split ring 18 having a suitable friction lining 19 thereon for engaging the cylindrical braking surface of the split sleeve 12. A tapered pin 20, which is formed as an integral part of the closed end of the outer housing member 10 and extends inside of the inner tubular member 14 along the longitudinal axis thereof, is tapered so that the free end is smaller than the base of the pin. A plurality of passages 22, one of which communicates with each of the annular grooves 16, contain a plurality of balls 24 which are in contact with the split rings 18 and tapered pin 20. A restraining mechanism for preventing relative movement of the outer and inner tubular members 10 and 14 away from each other after a predetermined amount of relative movement of the members towards each other includes a lock sleeve 26 surrounding the housing member 10 and a plurality of balls 28 located in passages 30 formed in the housing member. In the position shown, which is the locked position, the balls 28 are urged against the split sleeve 12 by the lock sleeve and prevent the split sleeve from moving radially outwardly. A spring 32, which abuts a shoulder 34 formed on the housing member and a shoulder 36 formed on the lock sleeve urges the sleeve towards this locked position. Movement of the lock sleeve to an unlocked position permits the balls 28 to move into annular recesses 38. Such movement allows the split sleeve 12 to move radially outwardly and relieves the frictional engagement between the split rings 18 and split sleeve.

Operation of this energy absorbing device will be as follow: As inner cylinder 14 strokes into outer cylinder 10, the balls 24 will follow the contour of tapered pin 20 and will force the split rings 18 radially outwardly into frictional engagement with the split sleeve 12. The father inner cylinder 14 strokes into outer cylinder 10 the greater will be the frictional engagement between the split rings and the split sleeve. At the end of the stroke, the inner cylinder will be restrained from moving outwardly. In order to release the inner cylinder 14, lock sleeve 26 is moved to its unlocked position, thus permitting balls 28 to move into annular recesses 38. Movement of these balls into the recesses will permit further radial outward movement of the split sleeve 12, thus relieving the amount of frictional engagement between the split rings and split sleeve sufficiently to permit withdrawal of the inner cylinder 14 from outer cylinder 10. After the withdrawal stroke, lock spring 32 will return the lock sleeve 26 to its locked position and the components of the device will be in the proper position for the energy absorbing stroke.

In FIGURE 2, which shows another embodiment of the invention, it will be seen that numeral 50 designates an outer tubular housing member, the inner surface of which constitutes a cylindrical braking surface. An inner tubular member 54 is telescoped within the housing member and is axially movable relative thereto. A plurality of split rings 58 having radially inwardly directed wedge faces and suitable friction lining on the outer diameter thereof are located between a pair of compression rings 60 and 62 having radially outwardly directed wedge faces for engaging the wedge faces of the adjacent split rings 58. The ring 60 is formed on the end of the inner tubular member 54, whereas the ring 62 is formed on a piston 64 located with the outer tubular housing member 50. Individual annular rings 66 having radially outwardly directed wedge faces are located between each pair of split rings. Also located within the outer cylinder 50 is a fluid filled bellows 68, one end of which is suitably connected to the piston 64 and the other end of which is suitably connected to the closed end of the outer cylinder.

Operation of this energy absorbing device will be as follows: As inner cylinder 54 strokes into the outer cylinder 50, the pressure within the bellows 68 will increase. This increase in pressure in conjunction with the outwardly directed wedge faces of the rings 60, 62 and 66 will cause the split rings, which have inwardly directed wedge faces, to move radially outwardly into frictional engagement with the inner braking surface of the outer cylinder 50. As inner cylinder 54 is withdrawn from the outer cylinder, the pressure within the bellows decreases and the inner and outer cylinders will be in their proper positions prior to the next energy absorbing stroke.

The numerous applications and practical advantages which flow from such devices are believed to be obvious from the foregoing description, and other advantages may suggest themselves to those who are familiar with the art to which this invention relates.

Furthermore, although this invention has been described in connection with certain specific embodiments, it will be obvious to those skilled in the art that various changes may be made in the form, structure and arrangement of parts without departing from the spirit of the invention. Accordingly, I do not desire to be limited to the specific embodiments disclosed herein primarily for purposes of illustration, but instead desire protection falling within the scope of the appended claims.

Having thus described the various features of the invention what I claim as new and desire to secure by Letters Patent is:

1. A telescopic frictional shock absorber comprising an outer tubular member having an inner cylindrical braking surface located therein, said braking surface being formed on a split sleeve located within and spaced radially from said outer tubular member, an inner tubular member located within said outer tubular member and axially movable relative thereto, split ring means operatively connected to said inner tubular member for frictionally engaging said inner cylindrical braking surface, and force-transmitting means operatively connected to said split ring means for urging said ring means radially outwardly against said cylindrical braking surface upon relative movement of said inner and outer tubular members towards each other, said force-transmitting means comprising an axially disposed tapered pin fixedly connected to said outer tubular member and extending within said inner tubular member, and a plurality of balls located between and in contact with said split ring means and said tapered pin, and restraining means for preventing relative movement of said inner and outer tubular members away from each other after a predetermined amount of relative movement of said members towards each other, said restraining means including a lock sleeve surrounding said outer tubular member, and a plurality of movable elements located between and in contact with said split sleeve and lock sleeve, said lock sleeve having a first position for maintaining said elements in contact with said split sleeve and a second position for permitting said elements to move radially away from said split sleeve to relieve the amount of frictional engagement between said split rings and said split sleeve.

2. A telescopic frictional shock absorber, as defined in claim 1, wherein spring means are located between said outer tubular member and said lock sleeve for urging said lock sleeve towards said first position.

References Cited

UNITED STATES PATENTS

| | | | |
|---|---|---|---|
| 875,759 | 1/1908 | Whitcomb | 188—129 |
| 2,139,666 | 12/1938 | Bogart | 188—129 X |
| 2,646,860 | 7/1953 | Pirard | 188—129 |
| 2,752,149 | 6/1956 | Forcellini | 188—86 X |
| 3,054,478 | 9/1962 | Rumsey | 188—86 |

DUANE A. REGER, *Primary Examiner.*